US008768540B2

(12) United States Patent
Stone et al.

(10) Patent No.: US 8,768,540 B2
(45) Date of Patent: Jul. 1, 2014

(54) INTEGRATED AVIONICS SYSTEM

(75) Inventors: Cyro A. Stone, Peoria, AZ (US); James R. Troxel, Glendale, AZ (US); Gregory T. Stayton, Peoria, AZ (US)

(73) Assignee: L-3 Communications Corporation, New York, NY (US)

( * ) Notice: Subject to any disclaimer, the term of this patent is extended or adjusted under 35 U.S.C. 154(b) by 682 days.

(21) Appl. No.: 11/786,988

(22) Filed: Apr. 10, 2007

(65) Prior Publication Data

US 2008/0174472 A1 Jul. 24, 2008

Related U.S. Application Data

(60) Provisional application No. 60/790,884, filed on Apr. 10, 2006.

(51) Int. Cl.
*G01C 23/00* (2006.01)

(52) U.S. Cl.
USPC ................ 701/3; 701/4; 701/7; 701/8; 701/9; 701/10; 701/11; 701/18; 701/408; 701/301; 342/29; 342/30; 342/32; 342/37; 342/46

(58) Field of Classification Search
USPC ................................................ 701/22; 342/30
See application file for complete search history.

(56) References Cited

U.S. PATENT DOCUMENTS

| | | | | |
|---|---|---|---|---|
| 6,353,846 | B1 * | 3/2002 | Fleeson | 718/104 |
| 6,545,631 | B2 | 4/2003 | Hudson et al. | |
| 6,999,022 | B1 | 2/2006 | Vesel et al. | |
| 7,006,032 | B2 | 2/2006 | King et al. | |
| 2005/0156777 | A1 * | 7/2005 | King et al. | 342/29 |
| 2007/0050101 | A1 * | 3/2007 | Sacle et al. | 701/11 |

FOREIGN PATENT DOCUMENTS

WO 01/42932 A2 6/2001

* cited by examiner

*Primary Examiner* — Redhwan K Mawari
(74) *Attorney, Agent, or Firm* — Allen J. Moss; Squire Sanders (US) LLP

(57) ABSTRACT

There is provided an avionics system that provides several avionics functions within a single LRU. In one embodiment, the system comprises a software-configurable RF assembly, one or more processor assemblies that are configured to provide multiple TAWS/TCAS/Mode S/ADS-B/ATC functions, interfaces to allow connections to aircraft electronics and data loaders, and multipurpose antennas. In one embodiment, a common processor architecture allows generic avionics processors to be configured to operate a number of TAWS/TCAS/Mode S/ADS-B/ATC functions without the need for multiple LRUs, and software-defined RF functions allow RF circuitry that interfaces to the processors to handle current and future communication needs.

1 Claim, 7 Drawing Sheets

Common Processor Assembly

INTEGRATED AVIONICS SYSTEM

CROSS REFERENCES TO RELATED APPLICATIONS

This application claims the full benefit and priority of U.S. Provisional Application Ser. No. 60/790,884, titled "T3CAS Providing TAWS, TCAS, ADS-B and ATC Functions in a Single LRU," filed on Apr. 10, 2006, the disclosure of which is fully incorporated by reference herein for all purposes.

BACKGROUND

1. Field of the Invention

The present invention generally relates to methods and systems for preventing collisions between aircraft and terrain, and for affording aircraft communications capabilities for enhancing air traffic safety. More particularly, the present invention relates to a reprogrammable integrated avionics system for aircraft.

2. Description of the Related Art

With today's crowded airspace and demanding timelines, the safe and efficient operation of aircraft presents many challenges. To address those challenges, manufacturers have designed modern aircraft to rely on an increasingly sophisticated collection of embedded electronics assemblies (or "avionics") to assist in flight management, aircraft operation, and navigation. In view of the historic importance of flight safety, use of certain avionics systems is mandated by government and international authorities depending on the particular aircraft configuration, mission, or manifest.

While modern avionics enhance safety and flight efficiency, the necessary hardware consumes significant amount of aircraft space and weight resources. Turning to the prior art illustration in FIG. 1A, an aircraft 100 is provided with standard avionics assemblies in LRUs (Line Replaceable Units) 110 that integrate with the aircraft's 100 electrical systems 120, antennae, and cockpit management systems. Each LRU 110 included in the aircraft adds weight to the aircraft, corresponding to a reduction in efficiency and aircraft performance. Likewise, each LRU added to an aircraft consumes space, often measured in ARINC standard volumes called "Modular Concept Units" or MCUs. An MCU measures 0.1905 m W×0.3241 m L×0.1941 m H, and is the basic building block module used in commercial aircraft system design.

Turning to prior art FIG. 1B, a common aircraft avionics configuration is shown for a collection of LRUs 110 with individual functions identified. Commonly, Ground Proximity Warning Systems (GPWS), Ground Collision Avoidance Systems (GCAS) and/or Terrain Awareness and Warning Systems (TAWS) 110A are included in the aircraft to inform pilots or other flight crewmembers of likely or imminent collision with terrain. For simplicity, these and other systems for warning pilots of potential collision with terrain are collectively and individually referred to herein as "TAWS." Also provided in a typical commercial aircraft configuration is a Traffic Collision Avoidance System (TCAS) 110B that is designed to reduce the danger of mid-air collisions between aircraft. TCAS systems monitor the airspace around an aircraft, independent of air traffic control, and warn pilots of the presence of other aircraft which may present a threat of mid air collision. The TCAS unit 110B interfaces with two directional antennas 130, 150 on the respective top and bottom surfaces of an aircraft, and also interfaces with a Mode S transponder. The TCAS unit may also host an Automatic Dependent Surveillance Broadcast receive (ADS-B In) function to assist with coordination of air traffic and airframe monitoring.

Also shown in FIG. 1B are two transponder or Air Traffic Control (ATC) units 110C, 110D, that may host a Mode S Transponder function or Automatic Dependent Surveillance Broadcast transmit (ADS-B Out) function to assist with coordination of air traffic and airframe monitoring. Top and bottom antennae 140A, 140B, 160A, and 160B are also shown respectively connected to the transponder or ATC units 110C, 110D.

The required suite of avionics units 110 in such prior art "federated" avionics systems consumes significant space and volume requirements. For the example configuration shown in FIG. 1B, 6 antennas are used for 4 line-replaceable units occupying 16 MCU, and having a total weight of 61.5 pounds. A reduction in the amount and size of avionics hardware is needed to decrease cost, provide more space for additional avionics equipment, and enhance operational performance and efficiency of avionics-equipped aircraft. Thus, a need exists for systems and methods which overcome these and other problems.

SUMMARY

It is an object of the present invention to overcome various problems associated with the prior art. It is also an object of the present invention to combine several avionics functions into a single reprogrammable assembly, thereby minimizing size, weight, and cost. It is also an object of the present invention to provide for an integrated and reconfigurable avionics system, whereby a common processor assembly provides interconnection between and partitioning of a collection of modules that interoperate to provide a comprehensive avionics hardware solution.

There is provided an avionics system that provides several avionics functions within a single LRU. In one embodiment, the system comprises a software-configurable RF assembly, one or more processor assemblies that are configured to provide multiple TAWS/TCAS/ADS-B/Mode S functions, interfaces to allow connections to aircraft electronics and data loaders, and multipurpose antennas. In one embodiment, a common processor architecture allows generic avionics processors to be configured to operate a number of TAWS/TCAS/ADS-B/Mode S functions without the need for multiple LRUs, and software-defined RF functions with associated RF circuitry that interfaces to the processors to handle current and future communication needs.

In an embodiment, the system includes a chassis or housing with an interconnection assembly or backplane coupled to a common power supply, and modular components that connect to and communicate via the interconnection assembly. Each component also receives power from the common power supply through the interconnect assembly or backplane. The integrated system contains sufficient RF transmitters and receivers to interrogate and receive replies from other transponder equipped aircraft.

A modular common processor assembly is included, which has onboard input-output logic circuitry, RF logic and control circuitry, and one or more surveillance communication processors (SCPs). Each SCP typically includes an integrated processor (such as a Power PC chip) coupled to a nonvolatile memory such as a Flash memory that has onboard code that may be executed by the integrated processor. Nonvolatile memory in the form of an EEPROM may also be included and coupled to the integrated processor. The SCP also includes volatile memory such as SDRAM for use by the processor in moving data and executing code, and control logic including programmable devices such as an FPGA (field-programmable gate array) or a CPLD (complex programmable logic device). A dedicated high-speed bus couples the volatile memory, nonvolatile memory, and control logic to the processor. In one implementation, additional common processor assemblies are included and integrated into the interconnect assembly, providing for additional processing power and/or redundancy of avionics functions.

A common RF (radio frequency) assembly is also included in the system and is coupled electrically via the interconnect assembly. The common RF assembly contains TCAS, Mode S and ADS-B surveillance capability and provides the functions necessary to translate data and information between RF frequencies and digital data formats. The common RF assembly is reconfigurable via software and has software-defined radio circuitry to provide for functionality of future radio protocols.

BRIEF DESCRIPTION OF THE DRAWINGS

The same numbers are used throughout the disclosure and figures to reference like components and features.

DETAILED DESCRIPTION

Figure 1A:
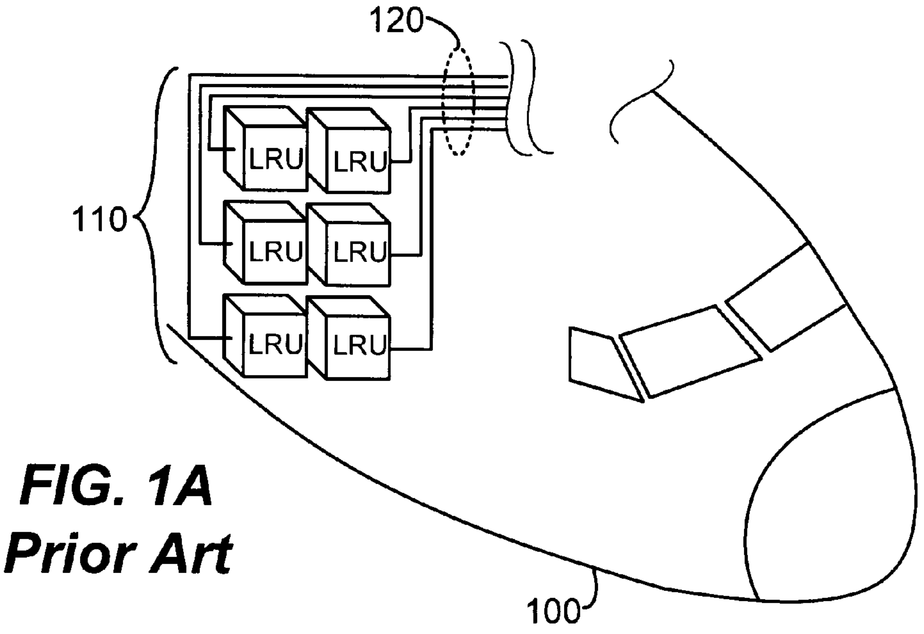
FIG. 1A Prior Art
FIG. 1A illustrates a prior art aircraft and avionics configuration, showing a collection of line-replaceable units (LRUs)
Figure 1B:
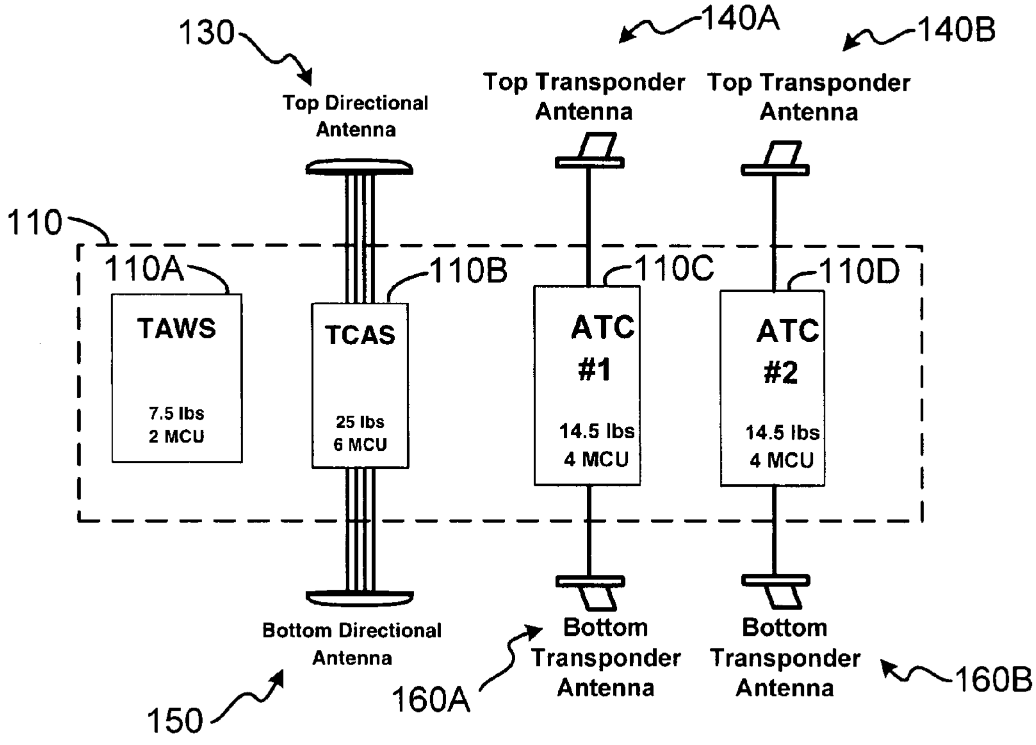
FIG. 1B Prior Art
FIG. 1B depicts one example prior art "federated" avionics package for installation in aircraft.
Figure 2:
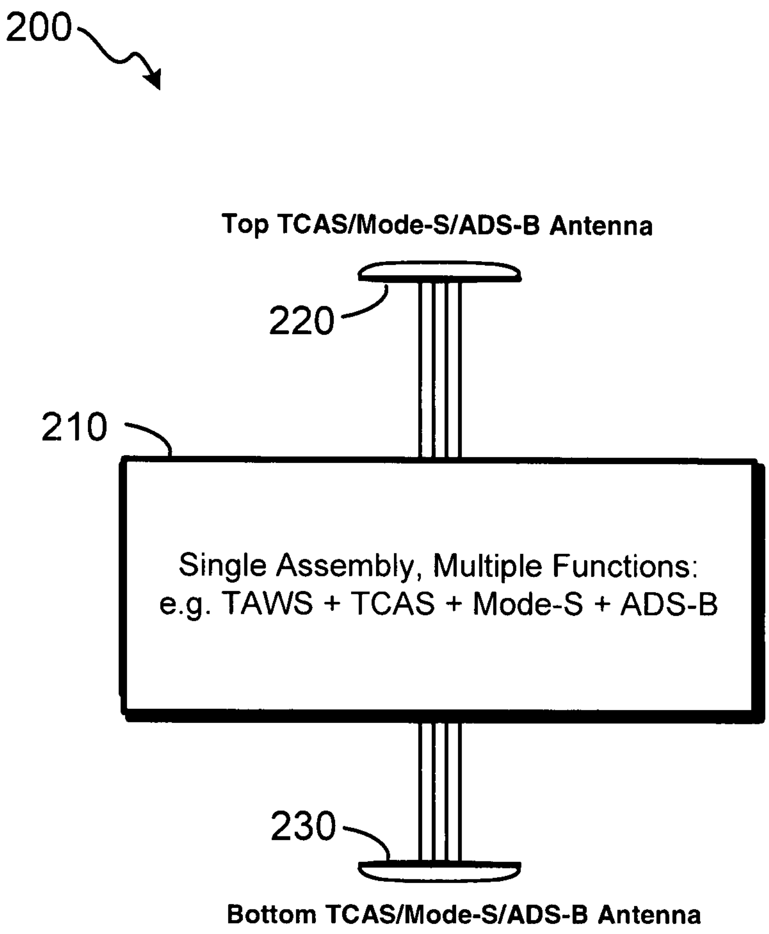
FIG. 2 shows a block diagram overview of an embodiment of an integrated avionics system consistent with the present invention.

Turning to FIG. 2, an overview of an improved avionics system 200 of the present invention is shown. A housing 210 contains components and circuitry to provide several avionics functions in a single LRU assembly, such as TAWS, TCAS, Mode S, and ADS-B. In one exemplary embodiment, a system incorporating these functions within a single LRU is capable of achieving a reduction in space of 4 MCU, a savings of over 25 pounds of weight, elimination of 2 antennae, and replacement of 4 LRUs with 2 LRUs.

In one embodiment, the assembly includes interfaces to a top TCAS/Mode S/ADS-B antenna 220, and a bottom TCAS/Mode S/ADS-B antenna, 230, which by virtue of being configured to operate in a directional or omnidirectional mode, reduces the need for separate omni and directional antennae. Therefore, the existing TCAS directional antenna is utilized in a way that allows it to be the traditional directional antenna required by TCAS as well as the omnidirectional antenna required for use with transponders. By applying the appropriate phases to the signals incident on the antenna connectors from the transmitter, the antenna can be made to operate in the directional mode or omnidirectional mode, allowing it to be used for both the TCAS, Mode S, and ADS-B functions, for example.

A Mode S function utilizes omni receive (4 RF receivers used to achieve omni receive coverage), thus eliminating the need for separate omni antennas. In addition, the Mode S and ADS-B function utilizes omnidirectional transmissions, accomplished by applying the appropriate amplitude and phase to the signals incident on the antenna connectors. Again, separate omni antennas are not required for the added functionality.

In one embodiment, the present system 200 is capable of reception and decoding of DF-17 ADS-B Extended Squitter messages, DF-18 ADS-B Extended Squitter & TIS-B messages, and DF-19 Military ADS-B Extended Squitter messages as specified in RTCA/DO-260A. These message formats can be used for a variety of ADS-B applications such as enhanced visual acquisition, surface traffic situational awareness, airborne self-separation, and airborne conflict management.

In one implementation, the system 200 operates in an extended range mode, which allows aircraft to be tracked to ranges of greater than 100 nmi. A number of significant hardware and software improvements as described in more detail below are used to implement this function.

In an embodiment, a TCAS aspect of the system 200 uses passive surveillance to provide extended range operations. Passive surveillance is enabled through the use of ADS-B technology. The system 200 receives DF-17 squitters from intruder aircraft's Mode S Transponders in order to compute the relative position. The DF-17 squitters encode aircraft latitude/longitude and altitude from an on-board position sensor such as a GPS or FMS. The system 200 accepts its own aircraft position information from an on-board sensor, and computes the relative position for the intruder aircraft via their received DF-17, DF-18, or DF-19 ADS-B in messages. This provides for very accurate relative position information for extended range intruders. As passive surveillance intruders enter the threat area for own aircraft, the surveillance method transitions to conventional active surveillance.

The TCAS receiver function in the system 200 contains a narrow bandwidth filter that is used when processing DF-17, DF-18, and DF-19 squitters. This filter is required to provide the receiver sensitivity improvement to allow for extended range reception. The filter allows the normal receiver sensitivity of −77 dBm to be improved by approximately 6 dB to −84 dBm. A 6 dB improvement in the receiver sensitivity doubles the reception range of the system 200.

Signal processing functions are implemented in the system 200 that support ADS-B functions. The implemented ADS-B functions improve the integrity of the ADS-B 1090 MHz datalink to provide a more robust link in high-density RF environments. The signal processing function provides for a dual minimum triggering level (MTL) that differs for DF-11 squitters used for TCAS processing and DF-17, DF18, or DF19 squitters used for ADS-B processing. In addition, a retriggerable reply process is required which allows for DF-11 squitters to have priority over ADS-B squitters.

Another enhancement provided by the use of ADS-B technology in a TCAS aspect of the system 200 is the ability to display intruder aircraft's flight identification (Flight ID) for ADS-B equipped targets. Part of the information available on the DF-17, DF-18, or DF19 squitters is the 8 character alphanumeric field that represents either the aircraft's flight number or tail number. An ADS-B function in the system 200 receives the flight identification for ADS-B equipped aircraft and outputs the information on the TCAS or other common or separate display bus. The flight ID can be displayed along with TCAS or ADS-B intruder tag information on displays, which are equipped for this function.

In one implementation of the system 200, an Altitude Alerter function allows for enhanced TCAS performance during resolution advisory encounters. The function is a part of the DO-185A (Change 7) implementation. The altitude Alerter uses the aircraft selected altitude input to allow for the aircraft to maintain climb or descent vertical profiles after a resolution advisory is encountered which would normally provide a level off command.

Figure 3:
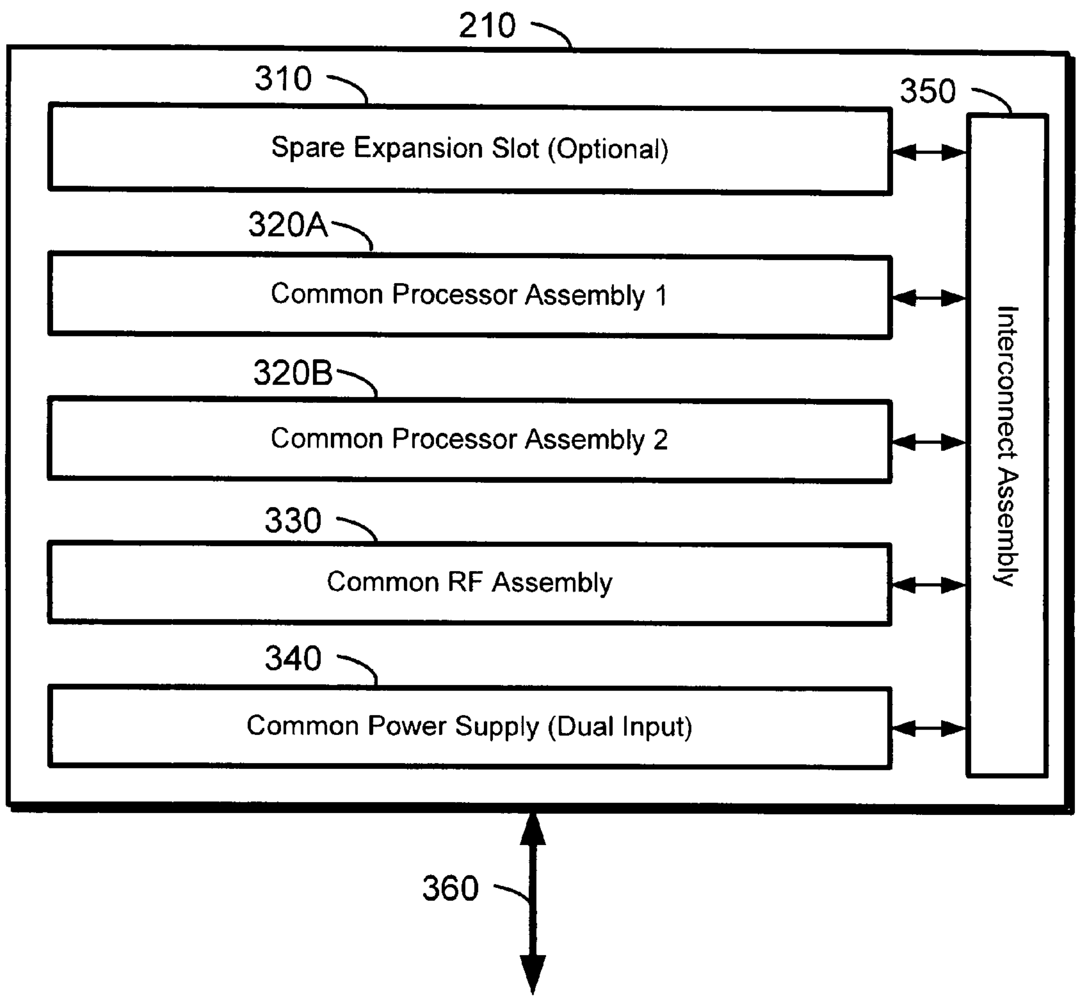
FIG. 3 illustrates a block diagram showing components of an embodiment of the present system.

Turning to FIG. 3, an illustration is provided, showing a block diagram of major components of an embodiment of the present system 200. A chassis or housing 210 encloses the hardware, electronics, and avionics that comprise the present system 200, and external interfaces 360 allows for the integration of the system 200 with aircraft 100 electrical/avionics systems 120 and or with dedicated interfaces such as an ARINC 615A Portable Data Loader (Ethernet) Interface. The system 200 includes a backplane or interconnect assembly 350 that provides connectivity to electrically couple the system components 310, 320A, 320B, 330, and 340. The interconnect assembly may also, in one implementation, provide a data/signal path from the components 310, 320A, 320B, 330, and 340 to the external interfaces 360.

A spare expansion slot 310 is provided in the housing 210, allowing for future upgrade of the system 200. In one embodiment, multiple expansion slots are provided that interconnect to the backplane or interconnect assembly 350.

In one implementation, within the housing 210, a common power supply 340 provides power to the components 310, 320A, 320B, and 330, through its connection to the interconnect assembly 350. Those of skill in the relevant arts understand that such power supply may comprise many different voltage outputs depending on the needs of the components 310, 320A, 320B, and 330, and may transform voltages from any number of different inputs to levels appropriate to the circuitry of the system 200. Power supply redundancy may also be included as necessary to meet system availability requirements, and those of skill in the relevant arts appreciate that additional common power supply elements similar to the common power supply module 340 may be included in the system 200 to accommodate these needs.

In one embodiment, the system 200 includes two or more common processor assemblies 320A, 320B that are electrically coupled to the interconnect assembly 350. The use of multiple processor assemblies allows for additional processing power to accomplish multiple avionics tasks, or to support redundancy requirements to enhance flight safety in the event of a hardware failure.

Figure 4:
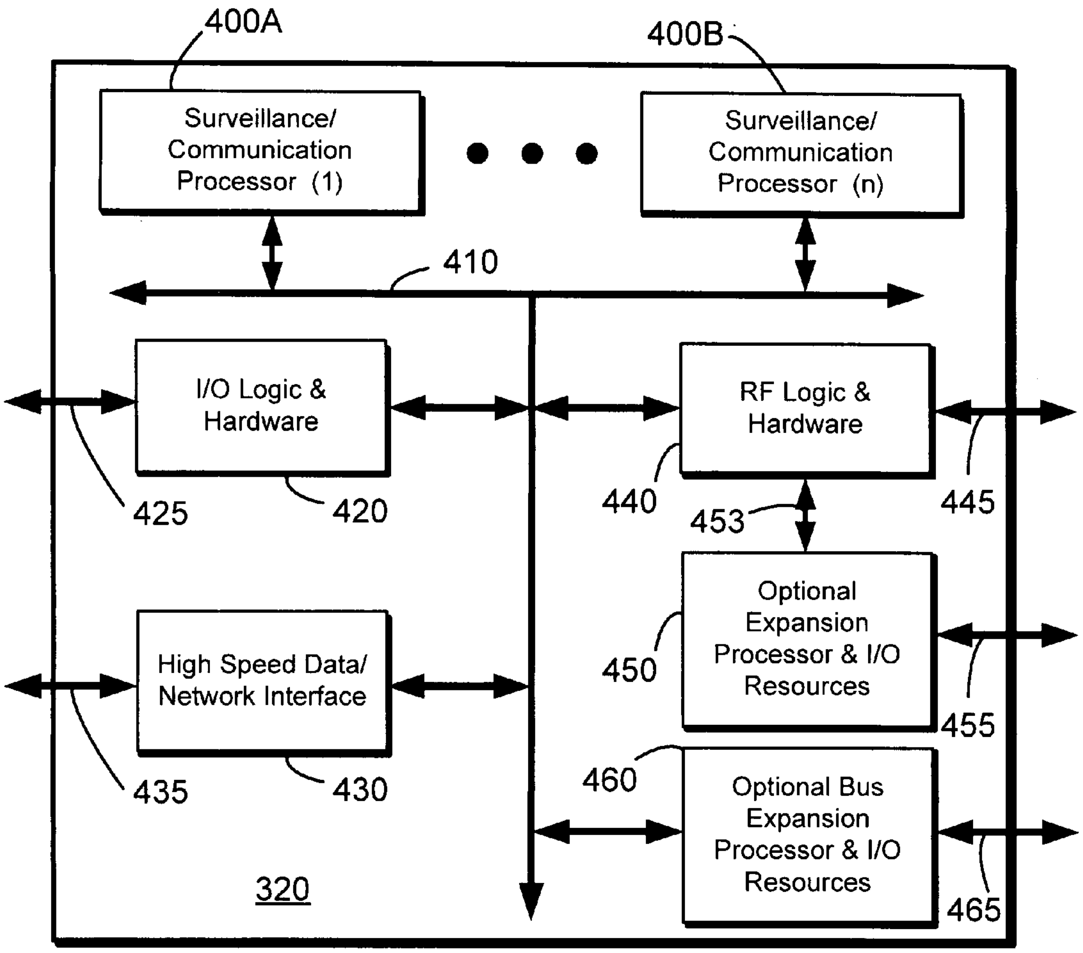
FIG. 4 illustrates a block diagram of the processor assembly of the present invention.
Figure 5:
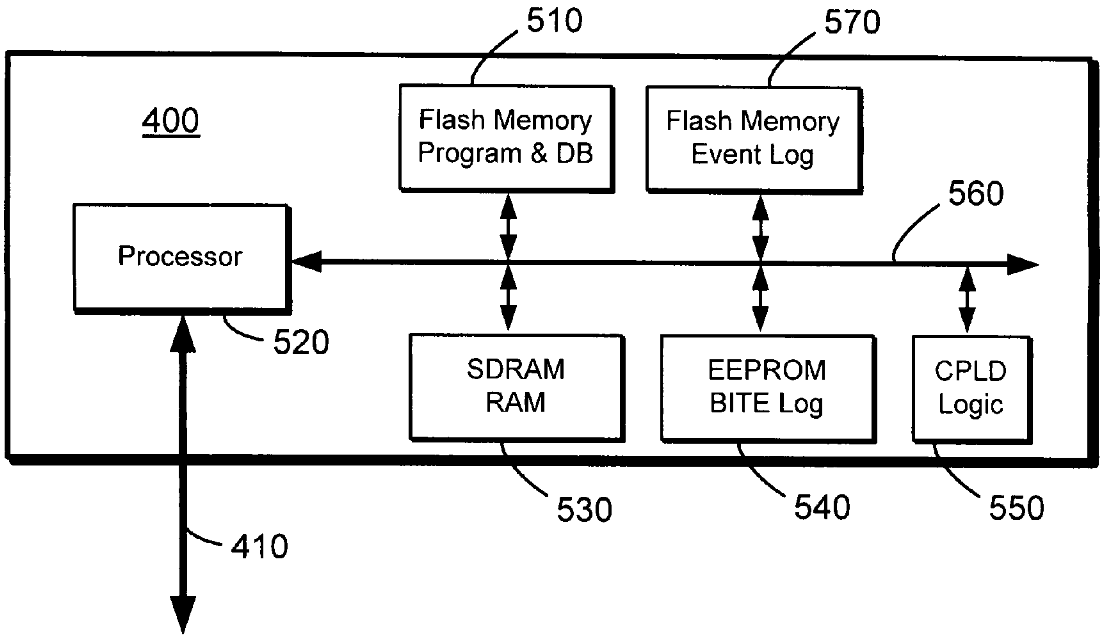
FIG. 5 shows a detailed block diagram of a surveillance communication processor (SCP)
Figure 6:
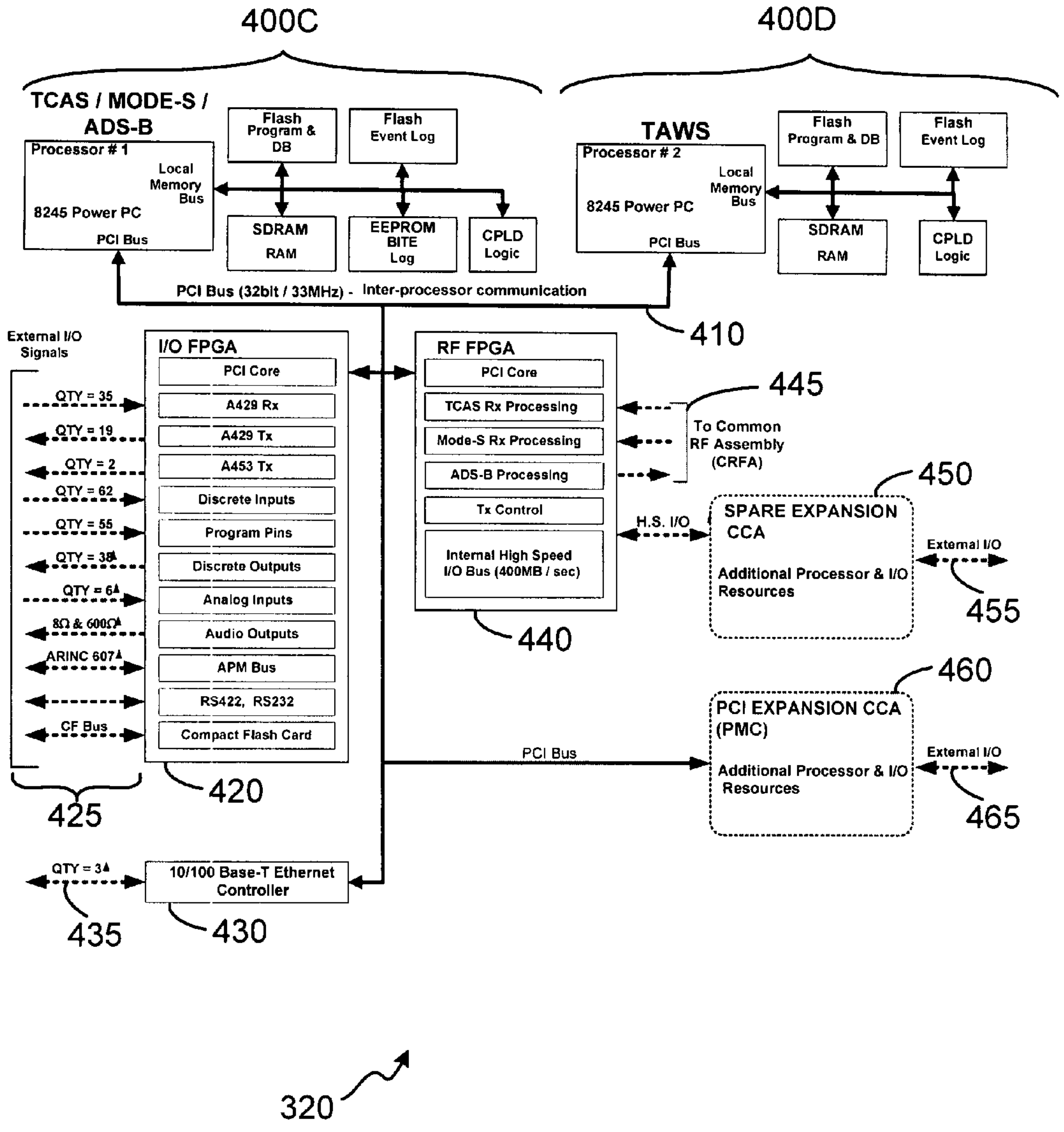
FIG. 6 depicts one illustrative embodiment of a processor assembly of the present system.

Turning to FIG. 4, a block diagram of a common processor assembly 320 is shown (also illustrated as 320A, 320B in FIG. 3). Examination of FIG. 4 is aided by review of FIG. 5, showing a more detailed view of a Surveillance Communication Processor 400 shown as 400A, 400B in FIG. 4, and 400C, 400D in FIG. 6, which represents a detailed implementation of one embodiment of the common processor assembly 320. The modular common processor assembly 320 includes onboard input-output logic circuitry 420, RF logic and control circuitry 440, and one or more surveillance communication processors (SCPs) 400A, 400B. While two SCPs are shown 400A, 400B, any number of SCPs (shown as "n" in 400B) may be utilized depending on the number of avionics-related functions that are desired to be supported within one common processor assembly 320. In one embodiment, an optional bus expansion processor with I/O resources 460 is provided, as well as an optional expansion processor 450. The common processor assembly 320 utilizes a high speed bus 410 to allow communications between system components, and in one implementation, the bus 410 comprises an industry-standard PCI bus. The use of a standard bus protocol such as PCI supports use of off-the-shelf high integration internal peripheral component technologies to provide greater data and processing integrity and higher throughput while reducing costs. In particular, processor to processor communication over PCI bus is far more efficient than the slower and less protected dual port RAM technique for multiple data access.

In one implementation, intelligent I/O devices are used to access processor memory directly instead of issuing time wasting interrupts, and to provide more flexibility in assigning particular I/O functions to particular processors. For example, the I/O Logic and Hardware circuit 420 manages the interface between components of the common processor 320 and a number of signal lines 425. In one embodiment, the I/O Logic element 420 is implemented with a field-programmable gate array (FPGA). Use of high density FPGAs instead of ASICs is possible with today's technology, providing for scaleable designs for future expandability. Likewise, the RF Logic and Hardware element 440 may be implemented, at least in part, through an FPGA, and in one embodiment, includes a PCI core, TCAS receive/transmit processing circuitry, Mode S receive/transmit processing circuitry, ADS-B receive/transmit processing circuitry, transmission control circuitry, and an internal high speed I/O bus. The RF logic element 440 also is coupled 445 to the common RF assembly 330, either through dedicated lines or through signal lines comprising part of the interconnect assembly 350.

Each SCP 400A, 400B typically includes (See also 400, FIG. 5) an integrated processor 520 (such as a Power PC chip) coupled to a nonvolatile memory such as a Flash memory 510 that has onboard code that may be executed by the integrated processor. Nonvolatile memory in the form of an EEPROM 540 or Flash Memory Event Log 570 may also be included and coupled to the integrated processor 520 through a dedicated high-speed processor bus 560. The SCP 400 also includes volatile memory 530 such as SDRAM for use by the processor 520 in moving data an executing code, and control logic 550 including programmable devices such as an FPGA (field-programmable gate array) or a CPLD (complex programmable logic device). The dedicated high-speed bus 560 couples the volatile memory 530, nonvolatile memory 510, 540, 570, and control logic 550 to the processor 520.

An embodiment of the common processor assembly 320 provides a high-throughput multiple microprocessor platform that may be utilized to implement Mode S transponder, surveillance, and collision avoidance algorithms in addition to providing for any added ADS-B functionality that may be required in the future. In one implementation, the processor 520 onboard the SCP 400 executes instructions stored in a memory such as the flash storage 510. Such execution may be used to run the operating system used by the SCPs 400A 400B, which, in one implementation, is a time and space partitioned RTCA/DO-178B certified operating system that will permit differing levels of certification requirements for the various new ADS-B applications. This platform will additionally support additional future Mode S transponder and TAWS functionality enabling less costly and simpler installations. Likewise, hardware growth is anticipated by providing room for additional processor circuitry 450, 460.

In one implementation, the time and space partitioned DO-178B certified operating system mentioned above allows for different levels of certification requirements for added functions. This is also important in maintaining the isolation of the TCAS function as a backup to all other ADS-B type functions added for ATC traffic management. With the isolation provided by the operating system, the ADS-B sensor data of the TCAS platform can be isolated and used independently of the TCAS collision avoidance functions.

In another embodiment, the common processor assembly 320 includes a maintenance history life-cycle feature that includes data, identification of problems found or lists of replaced components stored in non-volatile memory each time the unit is returned for service. For example, such information may be stored in hardware such as the nonvolatile flash memory event log 570. A PC program can then download information about each unit whenever it is returned to the shop to improve unit quality. In the event that the complete board for a common processor assembly 320 is replaced, an entry would be provided indicating that this has occurred. Other features of the processor assembly 320 may include an internal traffic advisory data recorder, an on-board maintenance system interface, and a Built-in Test (BIT) function.

An implementation of the common processor assembly 320 and system 200 includes a data interface that allows for software installation and updates. The high speed data/network interface 430 may interface with an ARINC 615A Portable Data Loader Interface through Ethernet 10 Base-T, for example. A Portable Data Loader connector on the housing 210 of the system 200 or an LRU connector on the housing 210 of the system contains the signals required by the ARINC 615A specification. The ARINC 615A Portable Data Loader interface may be used in performing future software updates to the system, which will become even more important as functions such as TCAS, Mode S and TAWS become increasingly integrated into a single platform.

Figure 7:
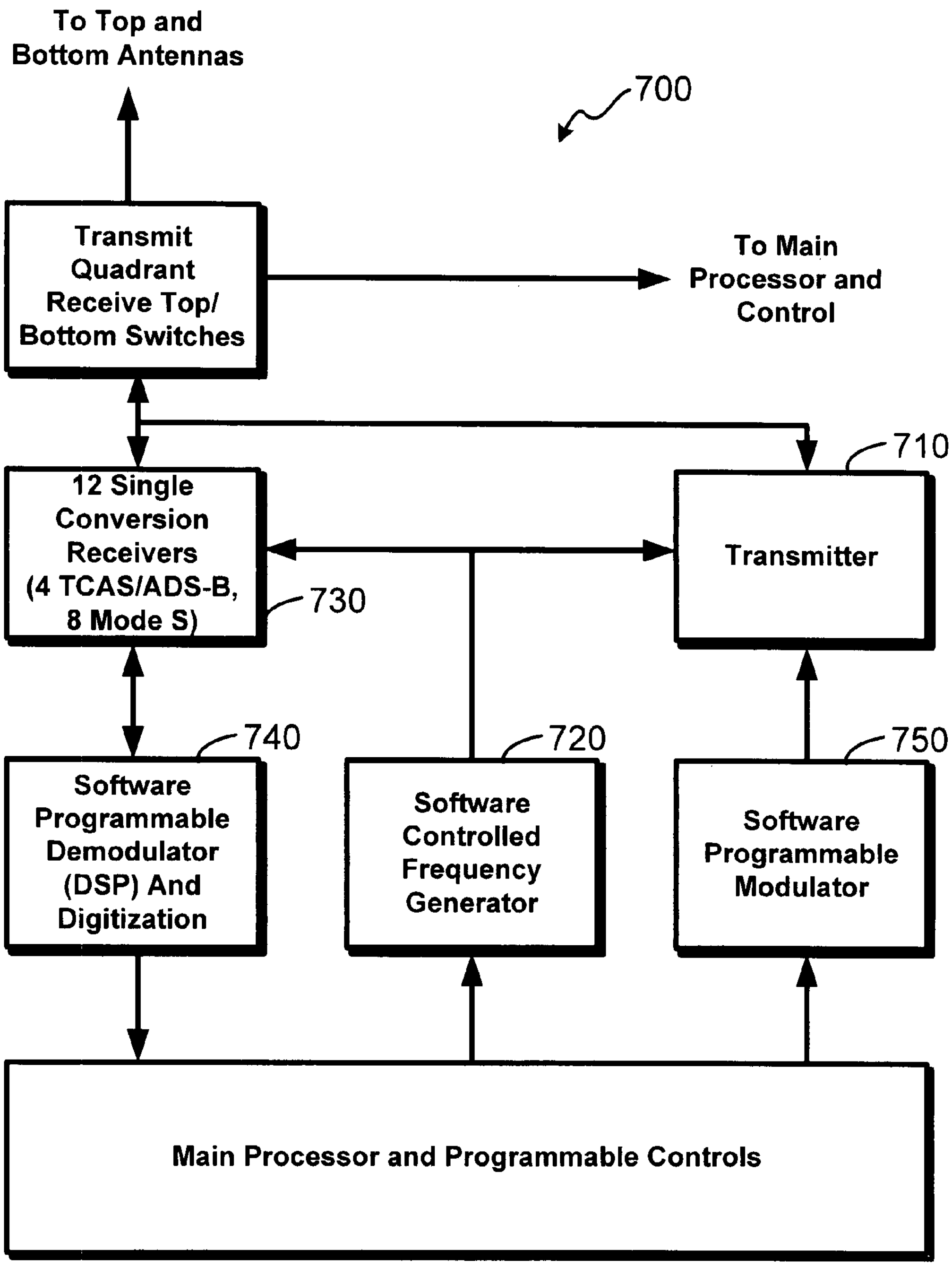
FIG. 7 illustrates a block diagram of a software-configurable RF assembly.

Turning to FIG. 7, software programmable RF circuitry 700 contains hardware to permit software only upgrades, providing not only TCAS functionality, but also Mode S transponder and ADS-B functionality. The programmable RF hardware also provides the flexibility to be software modified in the future should any new datalinks be established, such as in the case of Universal Access Transceivers (UATs) operating within the frequency range of 960 MHz to 1215 MHz. The RF assembly 330 supports TCAS, TAWS, Mode S, and ADS-B functionality utilizing the top and bottom directional antennas as shown in regards to FIG. 2. Separate Mode S transponders do not have to be provided simplifying the addition of future ADS-B software upgrades.

The RF section of FIG. 7 is designed to allow for different modulation schemes required for TCAS, Mode S, ADS-B, and future RF links. In one implementation, the transmitter 710 utilizes LDMOS instead of Bipolar RF transistors. This leads to a more efficient and physically smaller transmitter. The modulator 750 is then controlled via software, and therefore is flexible enough to meet the requirements of any L-Band transmitter. Frequency control 720 is also software controlled and agile enough to allow for different modes of operation.

The receiver-input chain 730 utilizes technology designed for SDR (Software Defined Radio) applications. This design approach is sufficiently flexible enough to accommodate L-BAND requirements and allow for future growth. In one embodiment, the inputs are converted to a baseband range for digital signal processing (DSP) 740. The DSP function 740 performs the demodulation, log amplifier, and filtering as required providing greater flexibility in the design to permit software only changes that may become necessary as future requirements change.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An avionics system comprising:

a software-configurable RF assembly, the software-configurable RF assembly comprising a single LRU providing multiple avionics functions;

a processor assembly including:

input-output logic circuitry;

RF logic and control circuitry;

a plurality of surveillance communication processors (SCPs), each SCP including an integrated processor coupled to:

a nonvolatile memory including executable code;

a volatile memory; and control logic; and a bus coupling the SCPs, the input-output logic circuitry, and RF logic and control circuitry; and means for electronically interconnecting the software-configurable RF assembly and the processor assembly.

* * * * *